United States Patent [19]
Souza

[11] Patent Number: 5,638,268
[45] Date of Patent: Jun. 10, 1997

[54] METHOD FOR INITIALIZING THE POSITION OF A LINEAR DRIVE SYSTEM

[75] Inventor: David P. Souza, Fall River, Mass.

[73] Assignee: Battenfeld Gloucester Engineering Co., Inc., Gloucester, Mass.

[21] Appl. No.: 345,259

[22] Filed: Nov. 28, 1994

[51] Int. Cl.⁶ .................................................. G05B 19/401
[52] U.S. Cl. ............... 364/167.01; 364/161; 364/474.14; 364/474.34; 493/2; 493/34
[58] Field of Search ........................ 364/167.01, 160–163, 364/174, 183, 180, 474.14, 184, 474.34, 474.17, 474.19; 318/561, 609, 610, 590, 591, 597, 598, 443, 444; 493/1–3, 34, 30

[56] References Cited

U.S. PATENT DOCUMENTS

| | | | |
|---|---|---|---|
| 4,045,660 | 8/1977 | Weisgerber et al. | 364/474.34 |
| 4,371,942 | 2/1983 | Damikolas | 364/474.34 |
| 4,484,287 | 11/1984 | Gamo et al. | 364/474.19 |
| 4,600,870 | 7/1986 | Martin | 364/162 |
| 4,745,557 | 5/1988 | Pekar | 364/474.3 |

*Primary Examiner*—Joseph Ruggiero
*Attorney, Agent, or Firm*—D. J. Shade

[57] ABSTRACT

A thermoplastic bag making machine having a sealing bar assembly driven by two separate linear drive units is initialized following full shutdown by traversing the linear drive units at constant velocity against mechanical stops, and then resetting position error signals and traversing the bar a known distance to a home position. This procedure is also useful for single linear drive units, as well as multiple linear drive units that must be coordinated for position and motion. In the case of multiple drive units, procedure for offsetting travel distances off the stop for non-uniformity in stop positions is utilized.

11 Claims, 6 Drawing Sheets

METHOD FOR INITIALIZING THE POSITION OF A LINEAR DRIVE SYSTEM

BACKGROUND OF THE INVENTION

1. Field of the Invention

The current inventions pertains to an improved method for initially locating the position of the sealing head on a machine for making thermoplastic bags. The method is also applicable to all linear numerically controlled drive systems.

2. Prior Art

Traditional machines for the manufacture of thermoplastic bags usually employ a mechanical drive system having a rotating main shaft for forwarding the folded plastic film to a sealing and severing station and for actuating the sealing and severing head. This coupled drive system frequently used a crank and slider mechanism in conjunction with a clutch/brake apparatus for forwarding the material to the sealing station and a cam mechanism to drive the sealing head. Both the crank and slider mechanism and the cam mechanism for driving the head are operated from the main drive shaft. See, for example U.S. Pat. No. 2,947,345. In these types of machines, each rotation of the main drive shaft results in the production of one bag, with approximately one-half of the period of the main drive shaft rotation available for forwarding the material to the severing and sealing station, with the remainder of the shaft rotation available for raising, holding, and lowering the sealing head onto the thermoplastic material.

In an effort to improve the rate of bag production, the limiting item believed to be the time available to forward the material to the sealing station, bag machines employing servo-drive system for forwarding the material to the sealing and severing station became common. One such machine is the model 3800 Polybag Machine, marketed by the assignee of the present invention. This machine, while using a servo drive system to forward the material to the sealing and severing station, retained a cam driven sealing head operated from the rotating main drive shaft. This machine achieved a marked improvement in bag production rate by more efficiently utilizing the overall cycle time. Specifically, the time available for forwarding material to the sealing and severing station was no longer limited to one half of the period of rotation of the main drive shaft, a constraint previously associated with the crank and slider mechanism. Other manufacturers also offered such types of bag making machines.

More recently, however, in attempts to further raise bag production rates, cam or crank drives for the sealing head operated from the rotating main drive shaft have begun to be replaced by stepper or servo driven sealing heads. See U.S. Pat. Nos. 5,002,522 and 5,230,688. As shown in both of the above referenced patents, despite the separate drive motors for the sealing head, the preferred mechanism for driving the head has remained one based on rotary motion, either a crank mechanism, U.S. Pat. No. 5,002,522, or a cam mechanism, U.S. Pat. No. 5,230,688. Whatever the success of these mechanisms, however, they limit the extremes of head motion to a fully down (sealing) position, and a fully raised position. In practice, a third head position, further away from the web than the usual fully raised position, is desirable.

In an effort to overcome the limitations of travel, the inventor of the present application has filed another patent application Ser. No. 08/337,282 filed Nov. 10, 1994, covering a linear drive system for a sealing head. During development of this head drive system, it became clear that some method for initially locating the position of the linear drives and head was necessary, as currently available numerical control units typically employ volatile memories. Any time that the machine would be fully powered down, as is currently required under OSHA regulations for maintenance purposes, the numerical processing unit would loose track of current position. This loss of position was usually overcome by introducing a limit switch into the path of travel of the linear device, so that, upon re-energization of the machine, the linear device could establish a known position by making the limit switch.

SUMMARY OF THE INVENTION

In accordance with the present invention, a linear head drive system is presented that provides a sealing position, a first raised position that is the upper limit of head motion during normal sealing operation, and a second raised position that is farther away from the web than the first raised position. The linear head drive system, which includes a linear drive unit, a heat sealing unit, and a numerical control unit for controlling the motion of the linear drive unit, includes a volatile memory in the numerical control unit, must be re-initialized after every power outage. In accordance with the present invention, there is presented a method for establishing the position of a linear drive system that does not involve limit switches placed in the path of the linear drive system. The method according to the present invention comprises the following steps:

a. limiting the power available to the linear drive system, b. moving the linear drive sytem at a known velocity towards a mechanical stop for a duration sufficient to bring the linear drive system into contact with the mechanical stop, c. timing out upon the mechanical stop, and d. resetting the position error.

DESCRIPTION OF THE PREFERRED EMBODIMENT

Figure 1:
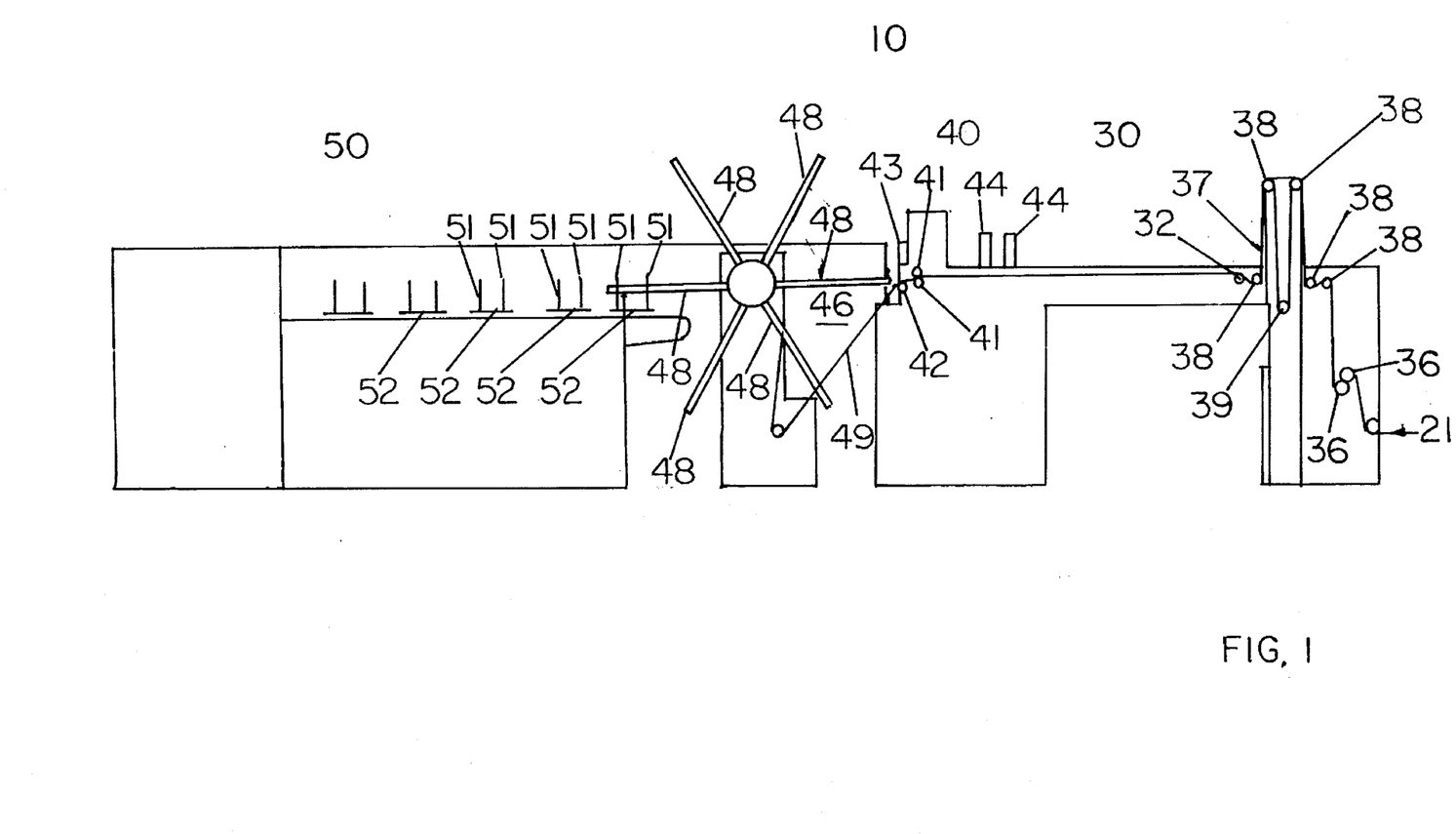
FIG. 1 shows the overall configuration of a thermoplastic bag making machine suitable for use with a linear head drive system.

Bag machine 10 is of a known type, having a compensation section 30, a sealing section 40, a transfer section 45, and a wicket conveyer section 50. Film 21 is drawn into compensation section 30 by capstan rolls 36. After the capstan rolls 36, film is passed over a series of fixed rolls 38 and under a movable roll 39 mounted for vertical motion under the control of an air balanced drive assembly, and then over and under a series of two more idler rolls. The movable roll and the two idler rolls on either side of the movable roll together form a low inertia accumulation device for film that also provides for a high degree of tension control in the film.

Modern high speed bag making machines such as the machine shown as 10 in FIG. 1 frequently will also have a single roll anti-bounce assembly 32 after film accumulation device 37. As shown in FIG. 1, anti-bounce assembly 32 comprises a driven roll, usually driven synchronously with the film draw rolls to be described below, but at a slightly lower speed.

Figure 2:
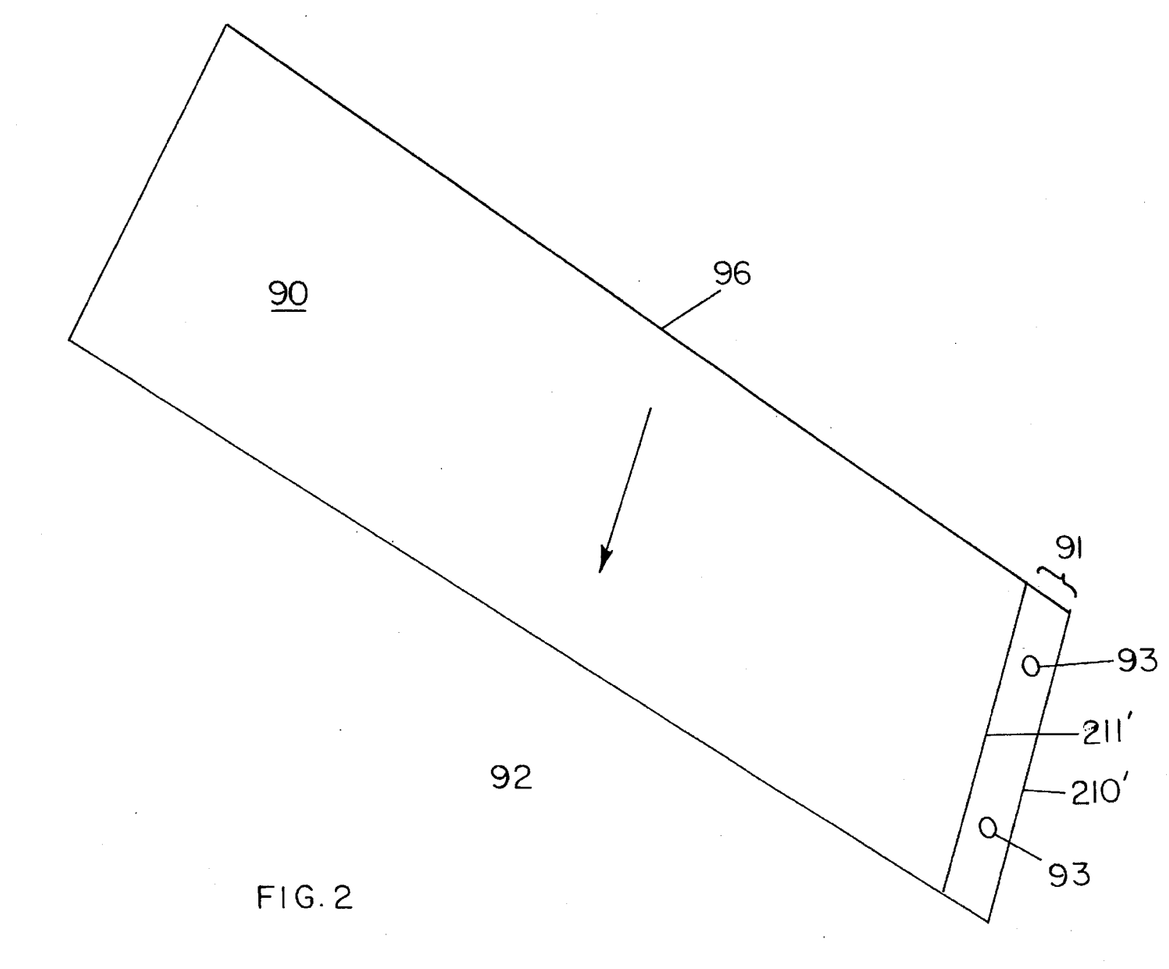
FIG. 2 shows a typical configuration for a bag produced by a bag making machine of the type described.

Following the accumulation device, the film passes towards draw rolls 41, through compensation section 30 wherein a series of hole punches 44 are installed. Hole punches 44 are used to form openings 93' in film 21 through which the transfer wicket pins 51 on wicket conveyer section 50 eventually will pass. As previously described, openings 93' are located in the transversely displaced portion of the web that will be the lip 91 of finished bag 90. Sealing section 40 contains draw rolls 41, sealing roll 42, hot knife 43, and their associated drive mechanisms. Although the present invention can be used on all known bag making machines, it is preferably used on modem bag making machines in which draw rolls 41 are driven by a numerically controlled servo-drive, and in which the hot knife 43 is driven by a linear drive system according to the present invention.. Draw rolls 41 are used to advance a length of folded film 21 corresponding to the width of the desired finished bag. Once this length of folded film has been advanced, hot knife 43 descends upon folded film 21 which is supported on sealing roll 42. The hot knife melts through the folded film, simultaneously severing folded film 21 and forming the trailing edge seal 96 on bag 90 and forming the leading edge seal 92' on folded film 21. Seal 92' will be the leading edge seal 92 on the next bag to be produced at sealing station 40. FIG. 2 shows a generic wicketed bag that could be made on the described bag making machine.

Upon advance of folded film 21 by draw rolls 41, the leading edge of folded web 21 containing leading edge seal 92' is advanced onto either a rope conveyer 46 as shown in FIG. 1, or onto a metal grid that serves as the pickup position of transfer section 45. A rope conveyer is schematically illustrated in FIG. 1. The location of the individual ropes 49 in the conveyer 46, as well as the conveyer mechanical structure, is selected to provide a relatively uniform support surface for the bag, but with necessary openings or channels 47 to permit passage of the individual arms 48 of rotary transfer device 45. In operation, the draw rolls deliver the sealed end of the film onto the rope conveyer 46, the hot knife 43 descends on the folded film 21 separating the material on the conveyer from the balance of the film 21 and simultaneously sealing the trailing edge of the material on the conveyer to form a completed bag 90 and forming the leading edge seal 92 on the folded film 21 in anticipation of formation of the next bag. Shortly after the sealing and severing of the material on the seal roll 42, a series of parallel and aligned transfer arms 48 on rotary transfer device 45 will pass through the open channels 47 in rope conveyer 46 and contact the bag 90 from beneath. The surfaces of the transfer arms 48 that contact the bag 90 have a series of ports, not shown in FIG. 1, that are connected through the structure of the rotary transfer device 45 to a source of vacuum. This vacuum, when applied to the bag through the ports in the transfer arms 48, hold the bag securely in place on the rotary transfer arms 48. Rotary transfer device 45 as shown in FIG. 1 has six sets of transfer arms 48. In practice, while six sets of transfer arms 48 are frequently used, other numbers of arms can also be used. Also, while two transfer arms 48 comprise each set as is customary for short bags, rotary transfer device 45 can have as few as two transfer arms 48 per set, or any number greater than three as required by the particular bag geometry.

Transfer arms 48 pick up a bag 90 at rope conveyer 46 as previously described, and carry it to a stacking station equipped with one or more largely vertical sets of transfer wicket pins 51 mounted on a stacking plate 52 attached to indexing conveyer chain 53. As the transfer arms 48 carrying the bag away from rope conveyer 46 continue to rotate, they will eventually deposit the bag 90 onto transfer wicket pins 51, with the pins 51 passing through the previously punched openings 93 along the bag lip 91. As the bags are passing over transfer wicket pins 51, transfer arms 48 carrying the bag 90 are disconnected from the source of vacuum The lack of vacuum releases the bag from the arm, and the bag drops to stacking plate 52 at the base of transfer wicket pins 51.

Wicket conveyer section 50 is of the customary configuration, having a single indexing conveyer chain 53 with the individual stacking plates 52 mounted thereon. Each stacking plate 52 will in turn have one or more upstanding transfer wicket pins 51 mounted thereon over which bags 90 will be deposited as they are stacked. Conveyer section 50 is located within the path of arms 48 on rotary transfer device 45, but nearer the arm that carries the top of the bag, i.e. that is adjacent to openings 93. As the transfer device continues to rotate, punched openings 93 in bag 90 will pass over the upstanding transfer wicket pins 51, and with continued rotation will slide down the pins 51 and be stripped from the rotary transfer device, with the bag being deposited on the surface of stacking plate 52. To aid in stripping the bag from rotary transfer device 45, It is also customary to disconnect transfer arms 48 from the source of vacuum as the bag 90 begins to slide over the transfer wicket pins 51.

Manufacture and delivery of the bags onto transfer wicket pins 51 will continue until a preselected number of bags corresponding to the desired number of bags in each stack has been produced at the sealing section 40. At that time, the sealing section 40 of the bag machine 10 will pass through one or more idle cycles, i.e. no material is delivered by draw rolls 41 to seal bar 43 and seal roll 42, to enable the wicket conveyer chain 53 to ultimately index the fully formed stack of bags from the stacking station 54 and present a new set of transfer wicket pins 51 on stacking plate 52 for collecting the next set of bags at stacking station 54 without interference from newly formed bags. Since rotary transfer device 45 has one or more bags in transit from sealing section 40 to stacking station 54 at any given time, indexing of wicket conveyer chain 53 is delayed until such time as the last of the counted bags is delivered to transfer wicket pins 51.

Figure 3:
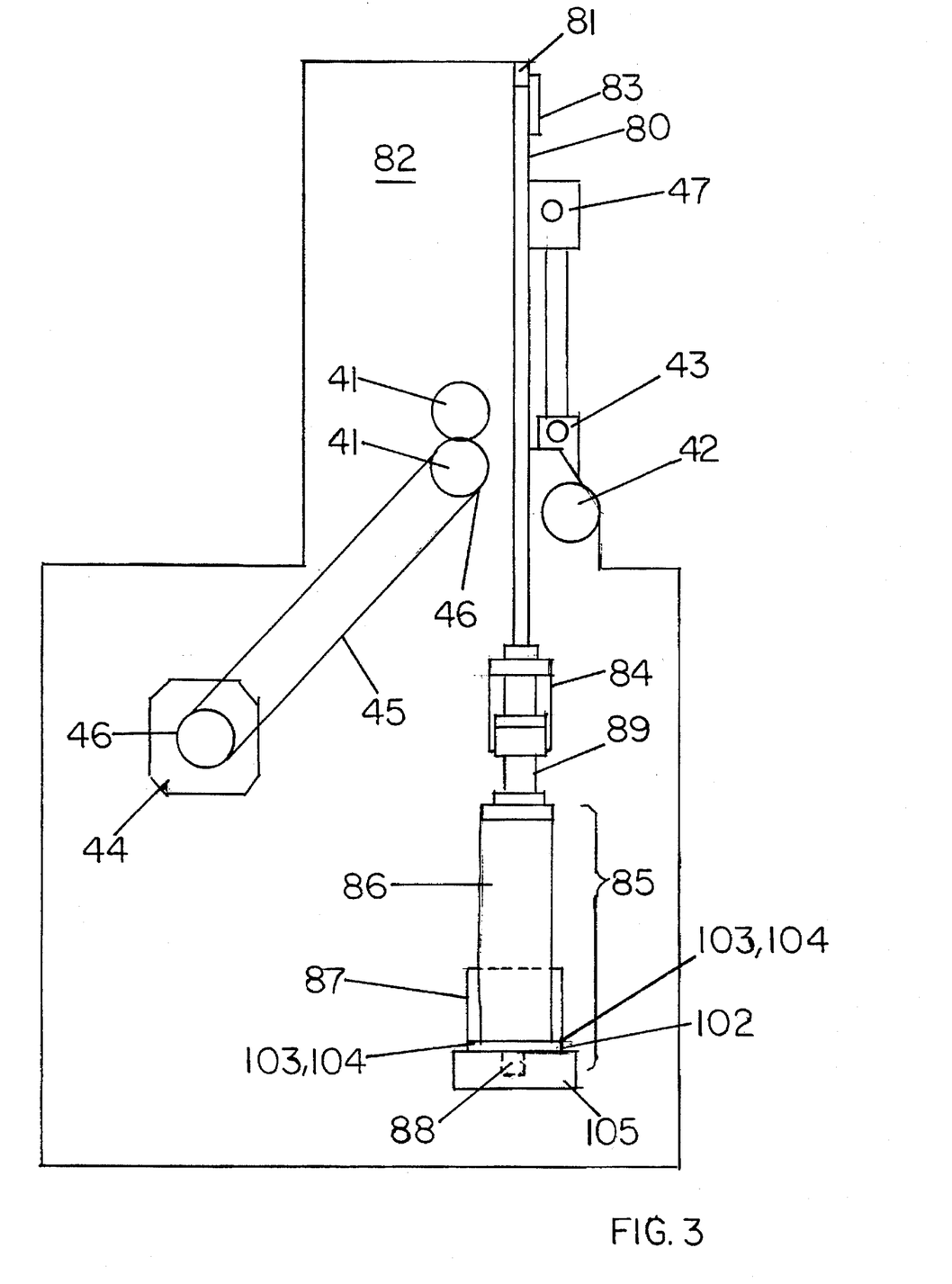
FIG. 3 shows a linear drive unit suitable for use in a linear head drive system.

FIG. 3 shows the main features of the severing and sealing station according to the present invention in greater detail. Draw rolls 41 are clearly shown, as is sealing roll 42. As shown in FIG. 2 seal bar 43 is in the sealing position, i.e. in contact with the seal roll 42. Although not shown in FIG. 2, it should be remembered that plastic film 21 will also be resting on seal roll 42, and seal bar 43 will first contact film 21, sealing and severing the film, before it contacts seal roll 42. Motor 44, which preferably will be a servo motor controlled by a numerical drive controller, is coupled to draw rolls 41 by a timing belt 45 and sprockets 46, or other conventional means.

Seal bar 43 is preferably of the type that is compensated for thermal expansion, so that the bar will maintain a straight sealing edge during high speed operation. Such a seal bar is shown in U.S. Pat. No. 5,205,899. Seal bar 43 is fixed to an attachment structure 47, which in turn is connected to the sealing head push rods 80, one push rod 80 at each side of the sealing bar 43. Push rods 80 are preferably mounted in recesses 81 machined into side flames 82, and are held into recess 81 at the top and bottom ends by upper retainer 83, and lower retainer 84, respectively. Lower retainer 84 is slotted to accomodate the attachment structure to thrust cylinder 86 as described in detail below. The lower surface of the slot in lower retainer is identified as 84a.

At the lower ends of each pushrod 80, means are provided to mount the pushrod 80 to linear drive unit 85. Linear drive unit 85 in the preferred embodiment consist of a thrust cylinder 86 powered by an electrical motor 87. Thrust cylinders manufactured by Parker Hannifin Corp. are currently preferred. Thrust cylinders of the type currently preferred utilize a ball screw and nut to convert rotary motion of input shaft 88 driving the nut into linear motion of output shaft 89. Motor 87 used to drive linear drive unit 85 may be a stepper motor or a servo motor. Currently a high speed ac motor driven by a series of pulses from a stepper control unit is preferred.

Figure 4:
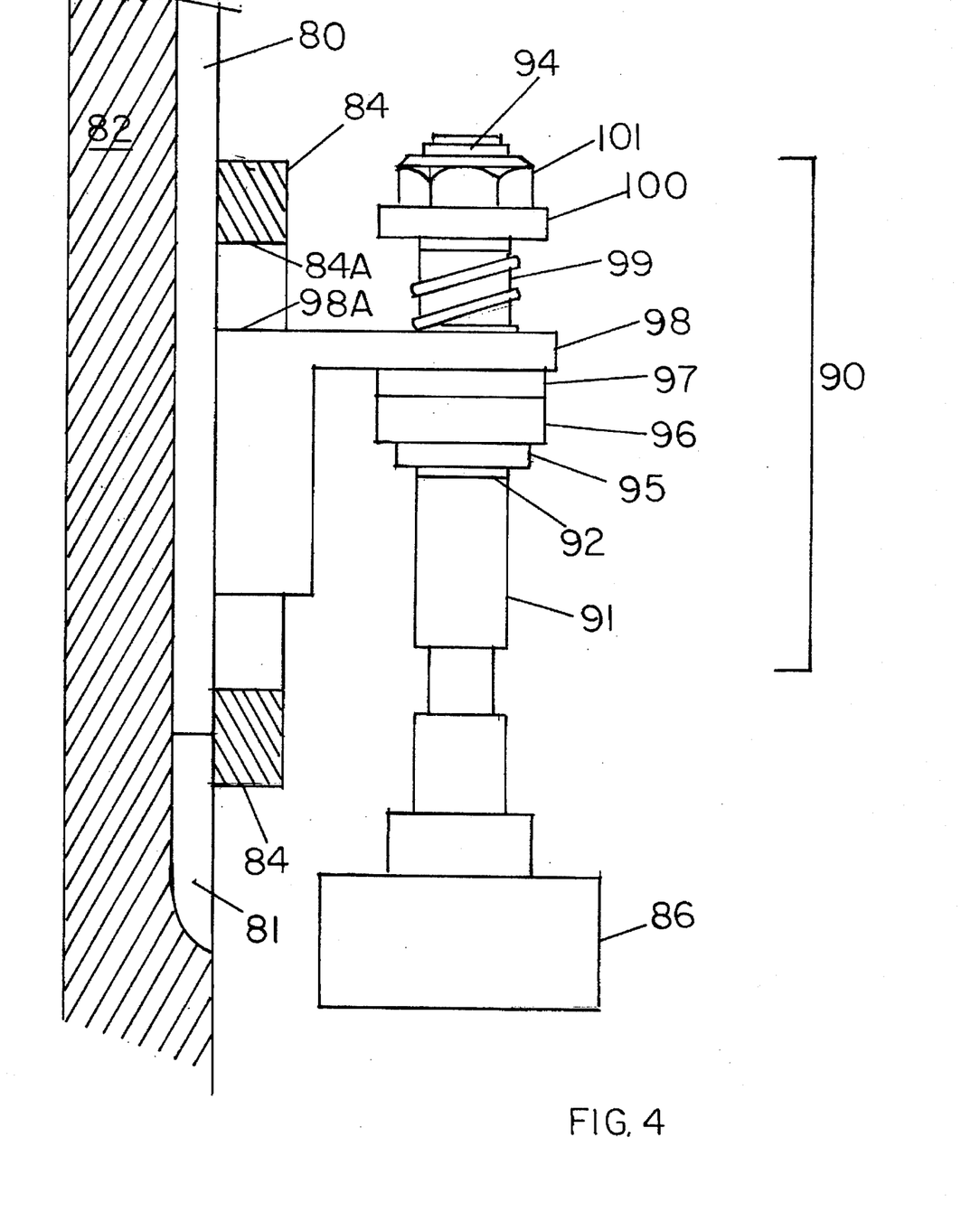
FIG. 4 show a method for coupling a linear drive system to a heat sealing head.
Figure 5:
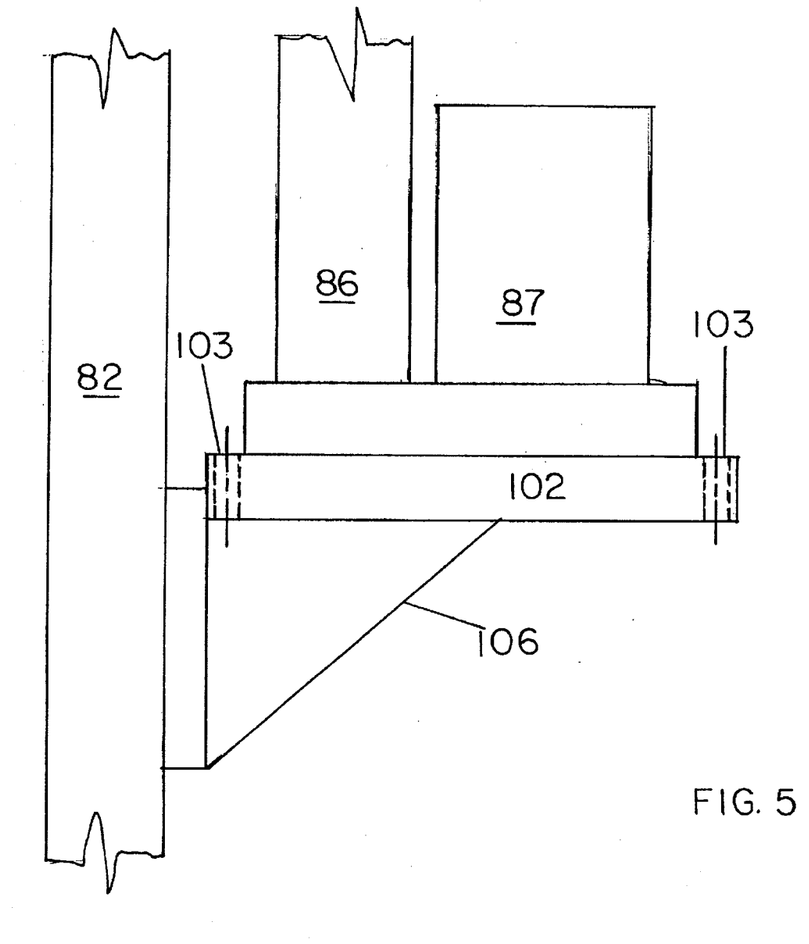
FIG. 5 shows an alternate method for attaching a linear drive system to a bag making machine.

FIG. 4 shows the detail on the connection between pushrod 88 and the thrust cylinder 86. Threaded onto the top of output shaft 89 from thrust cylinder 86 is a rod driver cylinder 90. Rod driver cylinder 90 has a lower portion 91, an abutment surface 92, and an upper portion 93 which includes a threaded top end 94. Mounted on rod driver cylinder 90 and resting on abutment surface 92 is a spherical bearing 95, which in turn carries a swivel collar 96. The combination of spherical bearing 95 and swivel collar 96 is used to absorb any misalignment between the mounting structure for the linear drive unit 85 and attachment to the pushrod 80. Above collar swivel 96 is a washer shaped bumper 97, which is preferably made from a stiff thermoplastic or elastomeric material. Currently, nylon is the preferred material for bumper 97. Pushrod driver block 98 then mounts on top of bumper 97, and is also connected to pushrod 80. The upper surface of pushrod driver block is 98a. Pushrod driver block 98 is the active connection between the thrust cylinder 86 and pushrod 80, and is used to transmit the linear reciprocating motion of thrust cylinder 86 into a reciprocating motion of seal bar 43. A compression spring 99 rest on top of pushrod driver block 98, and is compressed against the upper surface of pushrod driver block 98 by washer 100 and nut 101 which is threaded onto threaded top end 94 of pushrod driver cylinder 90. Compression spring 99, in conjunction with washer 100 and nut 101 form a lost motion connection between thrust cylinder 86 and pushrod 80, which allow over travel on thrust cylinder output shaft 89, so that precise stoppage of downward motion of thrust cylinder 86 when seal bar 43 contacts seal roll 42 is not required. Also, compression of spring 99 by nut 101 and washer 100 effectively sets the contact pressure for seal bar 43 on seal roll 42 at a given level of over travel. Although not shown in FIG. 4, pushrod driver block 98 is connected to pushrod 80 by any suitable means. A simple bolted connection is adequate.

It should also be noted in FIG. 4 that lower retainer 84 for seal bar pushrod 80 is slotted to accomodate pushrod driver block 98. The maximum stroke of thrust cylinder 86 is selected so that it is long enough to bring the upper surface of pushrod drive block 98 into contact with the lower surface of the slot in lower retainer 84. The lower surface of the slot in lower retainer 84 is identified as 84a, and the upper surface of pushrod driver block 98 is identified as 98a in FIG. 4.

With reference to FIG. 3, one method of attaching thrust cylinder 86 to bag machine 10 is shown. The base of thrust cylinder 86 contains an integral mounting pad 102, which includes several apertures 103 through which cap screws 104, or other conventional means of attachment, may pass to attach the thrust cylinder to a supporting structure in bag machine 10. As shown in FIG. 2, thrust cylinder 86 is mounted to transverse girt 105, which is also used to join the two side frames 82 and 82', (82' not shown in FIG. 3) of sealing section 40. Alternately, thrust cylinder may be mounted to bracket 106, which in turn is attached to side frame 82.

As previously indicated, both ends of seal bar 43 are driven. Each side of seal bar 43 will have a drive system identical to the one previously described. As is known to those familiar with construction of bag making machinery, the sealing head assembly can tolerate only limited skewing before the reliability of seal bar motion is affected. Since two separate drives are used for the head, their motions must be coordinated for reliable operation. Coordination of the motions of the two drive assemblies is achieved through the head drive control system.

Figure 6:
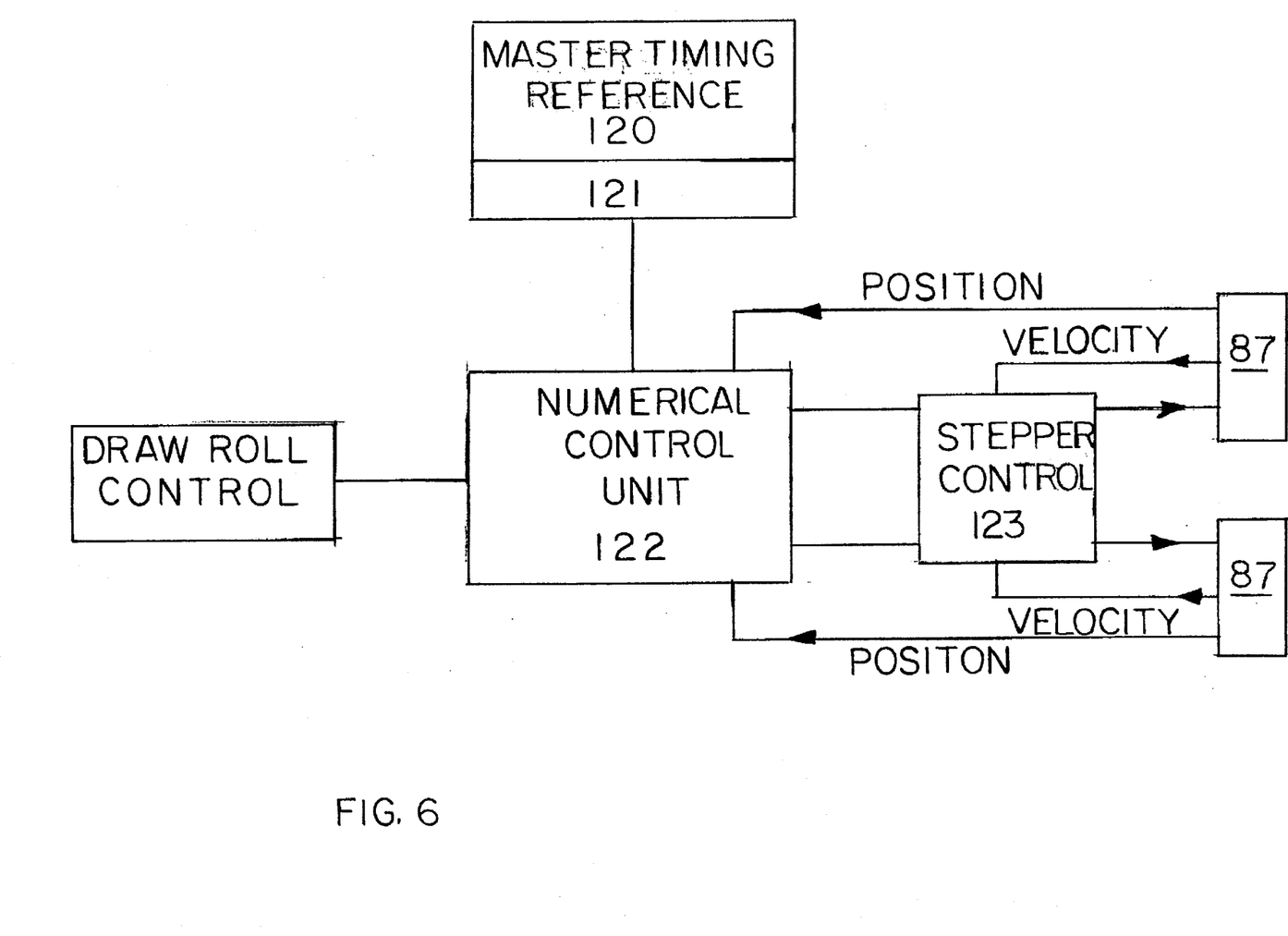
FIG. 6 shows a control schematic for the pricipal features of the linear head drive system.

The head drive control system consists of several discrete components. To coordinate motion, there is a master timing reference 120 as shown in FIG. 6, which should be a constant speed device based on the desired cyclic rate for the bag machine. In the case of a wicketer equipped bag machine such as the machine depicted in FIG. 1, rotary transfer device 45 can serve as the master timing signal. Position signals from encoder 121 on master timing reference 120 is input to numerical control unit 122, which is responsible for coordinating all machine functions. Numerical control unit 122 will have previously been programmed with the desired cyclic rate of bag production and the desired seal bar contact time as well as the complete control program. Based on these inputs, control unit 122 will calculate a profile for seal bar motion and dwell.

Numerical control unit 122 has also been programmed to provide for a second raised position that is farther away from web 21 and seal roll 42 when the bag making machine is not producing bags. This second raised position is useful for preventing damage to film 21 and the surface of seal roll 42 during non-operating periods of the bag making machine 10.

At the appropriate time based on the master reference, numerical control unit 122 will begin to output the desired head motion profile to stepper drive control unit 123. Stepper drive control unit 123 is a two channel unit, capable of driving two stepping motors. This input from numerical control unit 122 to the stepper control unit 123 coordinates the movement of the two linear drive units 85, one unit being attached to each end of seal bar 43. The numerical control unit is also responsible for coordinating motion of the draw rolls 41, with the initiation signal for draw roll motion taken from seal bar position, so as to ensure initiation of draw roll movement as soon as seal bar 43 has been lifted clear of the seal roll 42 and the web path. As is known to those familiar with control technology, feedback of position and/or speed of the various components of the bag making machine, including seal bar 43 may advantageously be used.

Stepper unit 123 is responsible for translating the desired movement profiles of seal bar 43 into a series of pulses which in turn are delivered to motors 87. These pulses, sequentially delivered to motors 87 control the movement of the motors and the seal bar 43. Typically, these pulses will cause the seal bar to cycle between a first raised position, and a sealing position in which seal bar 43 is in contact with film 21 and seal roll 42. Once in the sealing position, seal bar 43 will remain in contact with seal roll 43 for the previously selected sealing or dwell time. Upon completion of the preselected dwell time, numerical control unit 122 will provide movement signals to stepper unit 123 which will cause the seal bar 43 to lift from the surface of seal roll 42 and return to the first raised position. Cycling of seal bar 43 will continue, with each cycle being initiated from the master position reference.

While the foregoing description describes the normal operation of the machine, it must be remembered that upon powering up the machine after a complete shutdown, an initialization procedure is required to establish a home position for the seal bar drive system further to prior motion. The procedure can best be described as follows. Upon powering up, the machine operator will initiate a preprogrammed homing procedure. Normal machine run functions are disabled until this homing procedure is completed.

Upon initiating the homing procedure, the motor control circuitry which includes the numerical controller 122 and stepper control 123, will switch from proportional and integral mode to proportional mode only. The maximum current available to motors 87 will be limited to a relatively small percentage of the normal operating current, usually on the order of 25–30% full rated current, to limit the power output of the complete drive assembly, eliminating unnecessary wear and possible damage to the drive system components.

With controller 122 and stepper control 123 now in proportional mode only and the maximum output of the drive limited, motors 87 will be simultaneously commanded to raise the seal bar at a known velocity. The constant velocity raise command will be maintained for a programmed time interval of sufficient duration to insure that the upper surface of pushrod drive blocks 98a rest against the lower surface of slot in lower pushrod retainer 84a no matter where in the overall range of travel the move began. At the completion of this time interval and with both pushrod drive blocks 98 bearing against the lower pushrod retainer 84, the position error function in the controller is reset. Further, the controller is then reset to proportional and integral mode, and the maximum current limit to motors 87 is returned to full rated current. Numerical control unit 122 will now simultaneously initiate a downward movement of each motor 87 of a known distance. The location following completion of this downward movement is now the home position for this system, and is the position from which all operational movements are measured. Preferably, this home position is the second raised position. This initialization procedure results in position reference in synchronization for two separate motions, i.e. both sides of seal bar 43, without use of external position sensors such as limit switches, hall effect sensors, mechanical settings or adjustments, or the use of absolute position feedback devices.

The locations of lower push rod retainers 84 which are used as mechanical stops for the linear drive system do not have to kept within tight tolerances. The only limitation on location of these stops is that skewing of the head assembly sufficient to result in jamming or irregular motion must be avoided. Differences in position of these stops can be compensated by offsets in the distance downward that the drives are moved in the final stages of the initialization process. Any offset in this downward move distance should remain constant in a given assembly barring substantial mechanical changes. Offset distances would reside in the initialization program for the numerical controller and can easily be altered if necessary.

While the initialization process has been described in conjunction with a bag machine seal bar assembly driven by two linear thrust cylinders, it should be appreciated that the process is much greater utility. For instance, the process can be used to establish a home position for any single linear drive unit. The linear drive units need not be a thrust cylinder, but could be applied, for example, to a servo driven hydraulic cylinder. In a similar fashion, any combination of two or more linear drive units could also be referenced and synchronized for motion using the current process. Further, any mechanical stop that would serve to stop motion of the linear drive system could also serve the stop function. These and other embodiments of the current invention are intended to fall within the scope of the following claims.

I claim:

1. A method for establishing a home position for a numerically controlled linear drive assembly which includes proportional and integral control functions including a position error function comprising:

a. Traversing the linear drive system at a constant velocity towards a mechanical stop for a preselected duration sufficient to bring the linear drive system into contact with the mechanical stop, and b. resetting the position error upon the passage of the preselected duration.

2. A method according to claim 1 further comprising:

a. traversing said linear drive system away from said mechanical stop for a known distance to establish a home position.

3. A method according to claim 2 further comprising:

a. limiting the power available from the linear drive system prior to traversing said linear drive system toward said mechanical stop, and b. restoring the power available from said linear drive system after resetting said position error.

4. A method for establishing a reference position and synchronizing two or more separately numerically controlled linear drive assemblies including proportional and integral control functions comprising:

a. disabling the integral control function, b. traversing said linear drive assemblies at a constant velocity towards mechanical stops for a preselected duration sufficient to bring each linear drive system into contact with a mechanical stop, c. resetting the position error of each system upon the expiration of the preselected time duration, and d. enabling the integral control function in each system.

5. A method according to claim 4 further comprising:

a. traversing said linear drive system away from said mechanical stops for a known distance to establish a home position.

6. A method according to claim 5 further comprising:

a. offsetting said known distance to compensate for non-uniformities in the location of said mechanical stops.

7. A method according to claim 6 further comprising:

a. limiting the power available from said linear drive systems prior to traversing said linear drive system toward said mechanical stops, and b. restoring the power available from said linear drive systems after resetting said position error.

8. In a thermoplastic bag making machine having a heat seal bar driven by two separate numerically controlled linear drive systems, said numerical controls including proportional and integral functions, the method of establishing a home position for and synchronizing the movement of said two separate linear drive systems comprising:

a. disabling the integral control functions, b. traversing said linear drive assemblies at a constant velocity towards mechanical stops for a preselected duration sufficient to bring each linear drive system into contact with a mechanical stop, c. resetting the position error of each linear drive system upon the expiration of the preselected time duration, and d. enabling the integral control function in each system.

9. A method according to claim 8 further comprising:

a. traversing said linear drive system away from said mechanical stops for a known distance to establish a home position.

10. A method according to claim 9 further comprising:

a. offsetting one of said known distances to compensate for non uniformity in the location of said mechanical stops.

11. A method according to claim 10 further comprising:

a. limiting the power output available from said linear drive systems prior to traversing said linear drive systems towards said mechanical stops, and b. restoring the power output available from said linear drive systems after resetting said position error.

* * * * *